United States Patent
Uchida

(10) Patent No.: US 9,300,233 B2
(45) Date of Patent: Mar. 29, 2016

(54) VEHICLE INCLUDING ROTATING ELECTRIC MACHINE, INVERTER, AND ELECTRONIC CONTROL UNIT; AND CONTROL METHOD FOR THE SAME

(71) Applicant: TOYOTA JIDOSHA KABUSHIKI KAISHA, Toyota-shi, Aichi-ken (JP)

(72) Inventor: Kenji Uchida, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/293,402

(22) Filed: Jun. 2, 2014

(65) Prior Publication Data
US 2014/0368142 A1   Dec. 18, 2014

(30) Foreign Application Priority Data
Jun. 12, 2013   (JP) .................. 2013-123383

(51) Int. Cl.
| | |
|---|---|
| H02P 6/06 | (2006.01) |
| B60K 6/445 | (2007.10) |
| B60L 3/00 | (2006.01) |
| B60W 10/08 | (2006.01) |
| B60W 10/115 | (2012.01) |
| B60W 20/00 | (2006.01) |

(52) U.S. Cl.
CPC . *H02P 6/06* (2013.01); *B60K 6/445* (2013.01); *B60L 3/003* (2013.01); *B60W 10/08* (2013.01); *B60W 10/115* (2013.01); *B60W 20/50* (2013.01); *Y02T 10/7258* (2013.01)

(58) Field of Classification Search
CPC ........................................................ H02P 6/06
USPC ................................ 318/400.21, 400.01, 700
See application file for complete search history.

(56) References Cited

U.S. PATENT DOCUMENTS

| | | | | |
|---|---|---|---|---|
| 5,629,567 | A | * | 5/1997 | Kumar .............................. 290/3 |
| 5,982,045 | A | * | 11/1999 | Tabata et al. ............. B60K 6/48 |
| | | | | 290/17 |
| 7,227,332 | B2 | * | 6/2007 | Suzuki et al. ................. 320/104 |
| 2010/0030412 | A1 | | 2/2010 | Mitsutani |
| 2014/0257618 | A1 | | 9/2014 | Hiasa et al. |

FOREIGN PATENT DOCUMENTS

| | | |
|---|---|---|
| JP | 2008-030515 A | 2/2008 |
| JP | A-2008-182841 | 8/2008 |
| JP | 2010-274788 A | 12/2010 |
| JP | 2012-016280 A | 1/2012 |
| WO | 2013/057831 A1 | 4/2013 |

* cited by examiner

*Primary Examiner* — David S Luo
(74) *Attorney, Agent, or Firm* — Oliff PLC

(57) ABSTRACT

A vehicle including an AC rotating electric machine, an inverter, and an electronic control unit is provided. When an overcurrent abnormality occurs, i.e., phase current of a motor-generator exceeds a permissible value, in a high rotational speed region, the electronic control unit performs control (upshift control) for shifting up an automatic transmission provided between the motor-generator and driving wheels, or control (neutral control) for bringing the transmission into a released state, so as to reduce the rotational speed of the motor-generator. If phase current is detected even when an all-gate turn-off command is generated to the inverter while the rotational speed of the motor-generator is reduced to be within a low rotational speed region under the upshift control or neutral control, the electronic control unit determines that a short-circuit fault occurs in the inverter.

13 Claims, 14 Drawing Sheets

F I G . 1
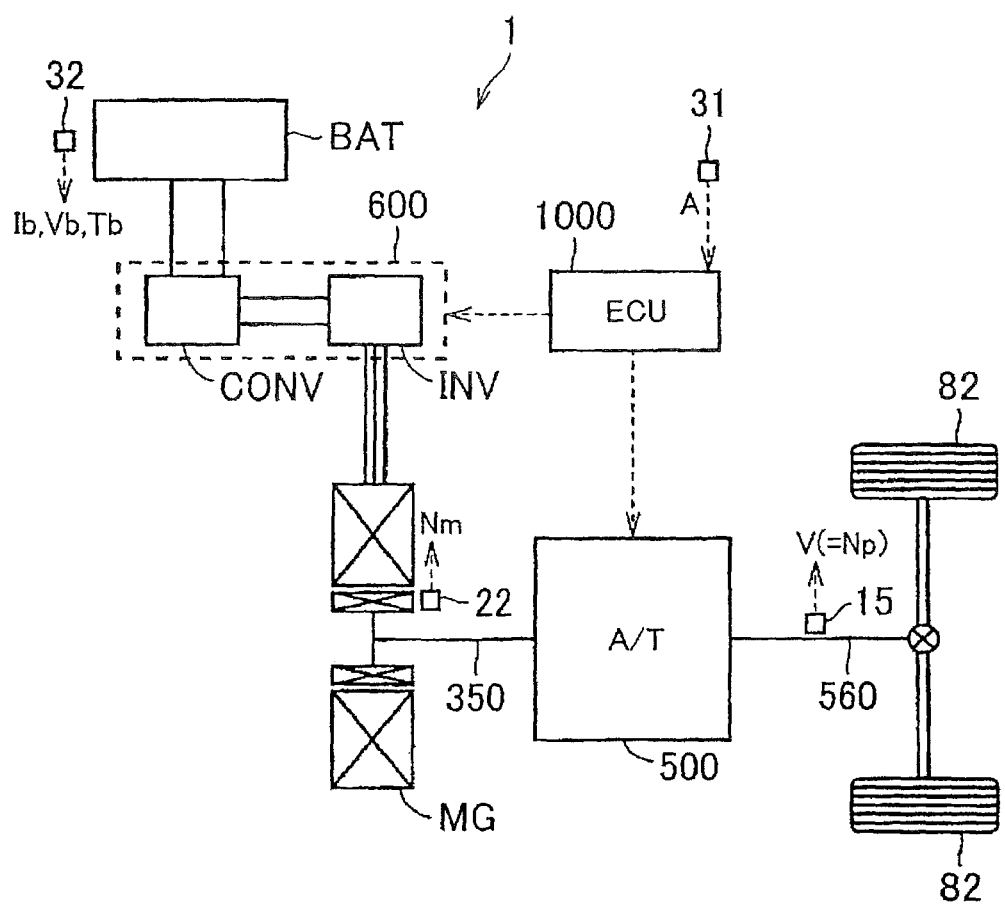

FIG. 4

| PHASE CURRENT WHEN ALL-GATE TURN-OFF COMMAND IS SENT TO INVERTER | LOW ROTATIONAL SPEED REGION R1 (BACK ELECTROMOTIVE FORCE ≤ DC VOLTAGE) | HIGH ROTATIONAL SPEED REGION R2 (BACK ELECTROMOTIVE FORCE > DC VOLTAGE) |
|---|---|---|
| WHEN INVERTER IS NORMAL | PHASE CURRENT | NO PHASE CURRENT |
| WHEN SHORT-CIRCUIT FAULT OCCURS IN INVERTER | NO PHASE CURRENT | NO PHASE CURRENT |

↑ REGION WHERE SHORT-CIRCUIT FAULT CAN BE DETERMINED

NEUTRAL REGENERATION CONTROL

UPSHIFT CONTROL

DOWNSHIFT CONTROL

US 9,300,233 B2

VEHICLE INCLUDING ROTATING ELECTRIC MACHINE, INVERTER, AND ELECTRONIC CONTROL UNIT; AND CONTROL METHOD FOR THE SAME

INCORPORATION BY REFERENCE

The disclosure of Japanese Patent Application No. 2013-123383 filed on Jun. 12, 2013 including the specification, drawings and abstract is incorporated herein by reference in its entirety.

BACKGROUND OF THE INVENTION

1. Field of the Invention

The invention relates to a vehicle and a control method for a vehicle, including a rotating electric machine, an inverter, and an electronic control unit, and in particular to a vehicle capable of running with power of the rotating electric machine.

2. Description of Related Art

In a vehicle including a motor-generator coupled to driving wheels, and an inverter that supplies electric current to the motor-generator, if the motor-generator rotates while a short-circuit fault occurs in a part of switching devices that constitute the inverter, overcurrent (current that exceeds a permissible value) may be generated due to back electromotive force of the motor-generator, as described in Japanese Patent Application Publication No. 2008-182841 (JP 2008-182841 A).

SUMMARY OF THE INVENTION

In the vehicle as disclosed in JP 2008-182841 A, overcurrent is generated if the motor-generator rotates in the condition where a short-circuit fault occurs in the inverter, as described above. However, when the rotational speed of the motor-generator is high, overcurrent is generated even when the inverter is normal. Accordingly, it cannot be appropriately determined whether a short-circuit fault occurs in the inverter, only by determining the presence or absence of overcurrent.

The invention provides a vehicle and a control method for a vehicle, including an AC rotating electric machine coupled to wheels, and an inverter configured to supply phase current to the rotating electric machine, wherein it can be determined whether a short-circuit fault occurs in the inverter, based on the presence or absence of overcurrent.

According to a first aspect of the invention, a vehicle including an AC rotating electric machine, an inverter, and an electronic control unit is provided. The AC rotating electric machine is coupled to a wheel of the vehicle. The inverter supplies phase current to the rotating electric machine. The electronic control unit is configured to perform reduction control for reducing a rotational speed of the rotating electric machine, when the phase current exceeds a permissible value to bring about an overcurrent abnormality during rotation of the rotating electric machine.

In the vehicle as described above, the electronic control unit may be configured to determine that a short-circuit fault occurs in the inverter, when the phase current flows in the rotating electric machine even when a command to bring the inverter into a gate turn-off state is generated while the rotational speed of the rotating electric machine is reduced to be lower than a threshold speed through the reduction control.

In the vehicle as described above, the electronic control unit may set the threshold speed, based on the rotational speed of the rotating electric machine obtained when back electromotive force produced in the rotating electric machine is equal to a DC voltage applied to the inverter. The threshold speed may be a variable value that is calculated according to the DC voltage, or may be a fixed value that is set based on the DC voltage that is not raised nor lowered when applied to the inverter.

The vehicle may further includes a clutch device that is provided between the rotating electric machine and the wheel, and is configured to be placed in a selected one of an engaged state, a released state, and a slipping state. Then, the electronic control unit may be configured to reduce the rotational speed of the rotating electric machine through the reduction control, by placing the clutch device in the released state or the slipping state.

The vehicle may further include a speed change device that is provided between the rotating electric machine and the wheel, and is configured to change a speed ratio that is a ratio of the rotational speed of the rotating electric machine to a rotational speed of the wheel. Then, the electronic control unit may be configured to reduce the rotational speed of the rotating electric machine through the reduction control, by shifting up the speed change device so as to reduce the speed ratio of the speed change device.

Where the above-indicated AC rotating electric machine is dented as a second rotational electric machine, and the inverter is denoted as a second inverter, the vehicle may further include a first rotating electric machine, a first inverter, a power storage device, and a speed change device. The first rotating electric machine may be coupled to the second rotating electric machine via a gear unit. The first inverter may supply phase current to the first rotating electric machine. The power storage device may be connected to the second rotating electric machine via the second inverter and connected to the first rotating electric machine via the first inverter. The speed change device may be provided between one of the first rotating electric machine and the second rotating electric machine, and the wheel, may be configured to be placed in a selected one of an engaged state, a slipping state, and a released state, and the speed change device may be configured to change a speed ratio of the speed change device in the engaged state. When the overcurrent abnormality occurs to one of the first rotating electric machine and the second rotating electric machine, the electronic control unit may be configured to reduce the rotational speed of the above-indicated one of the first rotating electric machine and the second rotating electric machine in which the overcurrent abnormality occurs, through the reduction control, and determine that a short-circuit fault occurs in the inverter corresponding to the above-indicated one of the first rotating electric machine and the second rotating electric machine in which the overcurrent abnormality occurs, when phase current flows in the above-indicated one of the first rotating electric machine and the second rotating electric machine even when a command to bring the inverter corresponding to the above-indicated one of the first rotating electric machine and the second rotating electric machine into a gate turn-off condition is generated, while the rotational speed of the above-indicated one of the first rotating electric machine and the second rotating electric machine is reduced to be lower than a threshold speed through the reduction control.

In the vehicle as described above, the electronic control unit may set the threshold speed of the first rotating electric machine and the threshold speed of the second rotating electric machine, based on the rotational speed of the first rotating electric machine and the rotational speed of the second rotating electric machine obtained when back electromotive force is equal to a DC voltage applied to each of the first inverter and the second inverter, the back electromotive force is produced in the first rotating electric machine and the second rotating electric machine. The threshold speed may be a variable value that is calculated according to the DC voltage. The threshold speed may be a fixed value that is set based on the DC voltage that is not raised nor lowered when applied to each of the first inverter and the second inverter.

In the vehicle as described above, the electronic control unit may be configured to reduce the rotational speed of the above-indicated one of the first rotating electric machine and the second rotating electric machine in which the overcurrent abnormality occurs, through the reduction control, by causing the other rotating electric machine in which no overcurrent abnormality occurs to produce regenerative torque while placing the speed change device in the released state or the slipping state, when electric power that can be received by the power storage device is equal to or larger than a predetermined value, and the electronic control unit may be configured to reduce the rotational speed of the above-indicated one of the first rotating electric machine and the second rotating electric machine in which the overcurrent abnormality occurs, through the reduction control, by changing a speed ratio of the speed change device, when the electric power that can be received by the power storage device is smaller than the predetermined value.

In the vehicle as described above, the electronic control unit may be configured to reduce the rotational speed of the above-indicated one of the first rotating electric machine and the second rotating electric machine in which the overcurrent abnormality occurs, through the reduction control, by causing the other rotating electric machine in which no overcurrent abnormality occurs to produce regenerative torque while placing the speed change device in the released state or the slipping state, when electric power that can be received by the power storage device is equal to or larger than a predetermined value. Also, the electronic control unit may be configured to reduce the rotational speed of the above-indicated one of the first rotating electric machine and the second rotating electric machine in which the overcurrent abnormality occurs, through the reduction control, by keeping the speed change device in the released state without changing a speed ratio of the speed change device, when the electric power that can be received by the power storage device is smaller than the predetermined value, and the speed ratio of the speed change device cannot be changed.

According to a second aspect of the invention, a control method for a vehicle including an AC rotating electric machine coupled to a wheel of the vehicle, and an inverter configured to supply phase current to the rotating electric machine includes: performing reduction control for reducing a rotational speed of the rotating electric machine, when the phase current exceeds a permissible value to bring about an overcurrent abnormality during rotation of the rotating electric machine.

In the vehicle or the control method for the vehicle according to the invention, which includes the AC rotating electric machine coupled to the wheel, and the inverter configured to supply phase current to the rotating electric machine, it can be determined whether a short-circuit fault occurs in the inverter, based on the presence or absence of overcurrent.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an overall block diagram of a vehicle according to a first embodiment of the invention;

FIG. 4 is a view showing the relationship among the presence or absence of a short-circuit fault in the inverter, rotational speed region of a motor-generator, and phase current generated when an all-gate turn-off command is sent to the inverter;

DETAILED DESCRIPTION OF EMBODIMENTS

Figure 2:
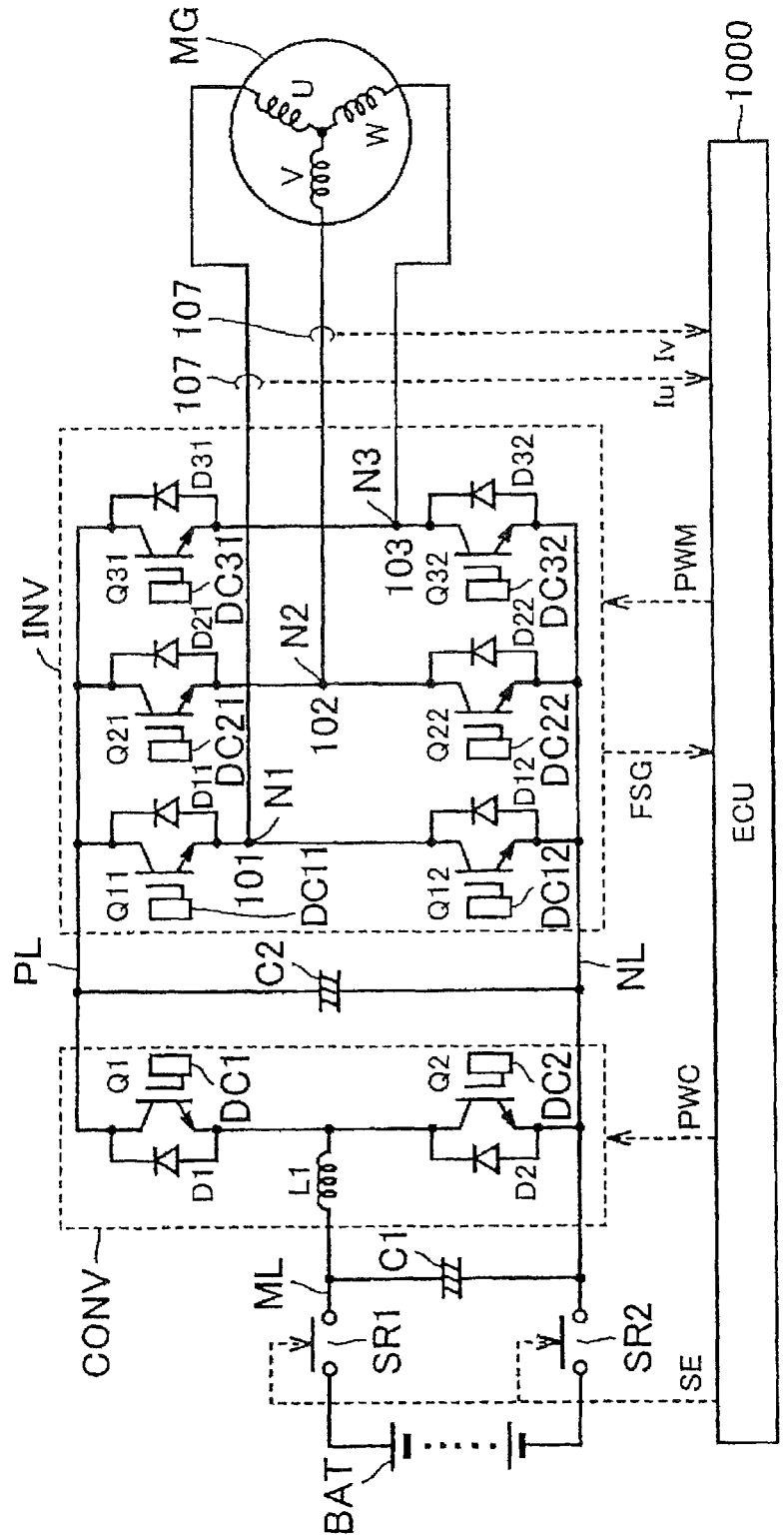
FIG. 2 is a view showing the detailed configuration of an electric circuit included in the vehicle of the first embodiment.

Some embodiments of the invention will be described with reference to the drawings. In the following description, the same reference numerals are assigned to the same components, which have the same names and functions. Accordingly, these components will not be repeatedly described in detail.

Initially, a first embodiment of the invention will be described. FIG. 1 is an overall block diagram of a vehicle 1 according to this embodiment. The vehicle 1 includes a motor-generator MG, an automatic transmission (A/T) 500, a power electronic control unit (which will be called "PCU") 600, a power storage device BAT, and an electronic control unit (which will be called "ECU") 1000.

The vehicle 1 is an electric vehicle that runs with power of the motor-generator MG rotating driving wheels 82. This invention may be generally applied to electrically-driven vehicles capable of running using power of a motor. Accordingly, the vehicles to which this invention may be applied are not limited to electric vehicles, but include hybrid vehicles and fuel cell vehicles. In the first embodiment, the invention is applied to the case where the vehicle 1 is an electric vehicle.

The motor-generator MG is an AC rotating electric machine, and functions as a motor and a generator. A rotor of the motor-generator MG is coupled to the driving wheels 82 via an automatic transmission 500.

The motor-generator MG is typically in the form of a three-phase (U-phase, V-phase, W-phase) permanent magnet synchronous motor. Namely, permanent magnets are mounted in the rotor of the motor-generator MG. A U-phase coil, V-phase coil, and a W-phase coil are wound on a stator of the motor-generator MG, and the other ends of the U-phase, V-phase and W-phase coils are connected to each other at a neutral point.

An input shaft of the automatic transmission 500 is coupled to the rotor of the motor-generator MG via a rotary shaft 350. An output shaft of the automatic transmission 500 is coupled to the driving wheels 82 via a drive shaft 560. The automatic transmission 500 has a gear unit including a plurality of hydraulic friction devices (clutches and brakes), and a hydraulic circuit that supplies a hydraulic pressure to each of the friction devices according to a control signal from the ECU 1000. The automatic transmission 500 is switched among an engaged state, a slipping state, and a released state, by means of a clutch device (not shown in FIG. 1) provided in the automatic transmission 500. In the engaged state, the entire rotary power of the input shaft of the automatic transmission 500 is transmitted to the output shaft of the automatic transmission 500. In the slipping state, a part of the rotary power of the input shaft of the automatic transmission 500 is transmitted to the output shaft of the automatic transmission 500. In the released state (neutral state), power transmission between the input shaft and output shaft of the automatic transmission 500 is cut off. While the automatic transmission 500 is normally controlled to the engaged state, it is temporarily placed in the slipping state or released state during shifting of gears, and then returned to the engaged state after completion of shifting.

The automatic transmission 500 according to this embodiment has two or more gear positions, and the gear position (speed ratio) of the transmission 500 in the engaged state can be selected from a plurality of predetermined gear positions (speed ratios). The speed ratio is the ratio of the input shaft rotational speed to the output shaft rotational speed. In this embodiment, the automatic transmission 500 has four forward-drive gear positions, i.e., first-speed through fourth-speed gear positions.

The PCU 600 converts DC power supplied from the power storage device BAT, into AC power, and delivers the AC power to the motor-generator MG, so that the motor-generator MG is driven. Also, the PCU 600 converts AC power generated by the motor-generator MG, into DC power, and delivers the DC power to the power storage device BAT, so that the power storage device BAT is charged with the DC power. The PCU 600 includes a converter CONV and an inverter NV. Detailed configurations of the converter CONV and the inverter INV will be described later.

The power storage device BAT stores DC power for driving the motor-generator MG. The power storage device BAT typically includes nickel hydride, or lithium ions.

The vehicle 1 includes a vehicle speed sensor 15, a resolver 22, an accelerator position sensor 31, and a monitoring sensor 32. The vehicle speed sensor 15 detects the rotational speed of the drive shaft 560 as the vehicle speed V. The resolver 22 detects the rotational speed of the motor-generator MG (which will be simply called "MG rotational speed Nm"). The accelerator position sensor 31 detects the amount of operation of the accelerator pedal by the user (which will be called "accelerator pedal position A"). The monitoring sensor 32 detects conditions (voltage Vb, current Ib, temperature Tb, etc.) of the power storage device BAT. These sensors output detection results to the ECU 1000.

The ECU 1000 incorporates a CPU (Central Processing Unit) and a memory, which are not shown in FIG. 1, and performs computations based on information stored in the memory and information received from the respective sensors. The ECU 1000 controls each device or equipment installed on the vehicle 1, based on the results of the computations.

The ECU 1000 calculates the state of charge (which will also be called "SOC") of the power storage device BAT, based on the detection result of the monitoring sensor 32. The ECU 1000 sets electric power WOUT (in watt) that can be generated from the power storage device BAT and electric power WIN (in watt) that can be received by the power storage device BAT, based on the SOC and temperature Tb of the power storage device BAT, for example. The ECU 1000 controls the PCU 600 so that the actual output power of the power storage device BAT does not exceed the above-indicated power WOUT. Also, the ECU 1000 controls the PCU 600 so that the actually received power of the power storage device BAT does not exceed, the above-indicated power WIN.

The ECU 1000 determines a target gear position of the automatic transmission 500 corresponding to the accelerator pedal position A and the vehicle speed V, referring to a predetermined shift map, and controls the automatic transmission 500 so that the actual gear position becomes equal to the target gear position.

FIG. 2 shows the detailed configuration of an electric circuit between the power storage device BAT and the motor-generator MG.

System relays SR1, SR2, capacitor C1, converter CONV, smoothing capacitor C2, and inverter INV are provided between the power storage device BAT and the motor-generator MG.

The system relay SR1 is interposed between a positive electrode of the power storage device BAT and a positive line ML, and electrically connects or disconnects the positive electrode of the power storage device BAT to or from the positive line ML, according to a system command SE. Similarly, the system relay SR2 is interposed between a negative electrode of the power storage device BAT and a main negative line NL, and electrically connects or disconnects the negative electrode of the power storage device BAT to or from the main negative line NL, according to the system command SE.

The capacitor C1 is connected between the positive line ML and the main negative line NL, and smoothens charge/discharge voltage of the power storage device BAT.

The converter CONV is configured to be able to boost or raise the voltage of the DC power discharged from the power storage device BAT, and supply the power to the inverter INV. The converter CONV is also configured to be able to lower the voltage of the DC power regenerated from the inverter INV, and supply the power to the power storage device BAT. More specifically, the converter CONY is configured as a chopper circuit that consists of power semiconductor switching devices (which will be called "switching devices") Q1, Q2, diodes D1, D2, and a reactor L1. In the converter CONY, drive control circuits DC1 and DC2 control ON/OFF of the switching devices Q1, Q2, respectively, according to a switching command PWC, so that switching operations are performed.

The switching devices Q1 and Q2 are connected in series between a main positive line PL and the main negative line NL. Also, one end of the reactor L1 is connected to a connection point between the switching device Q1 and the switching device Q2. In this embodiment, the switching device is in the form of IGBT, but a bipolar transistor, MOSFET (Metal Oxide Semiconductor Field Effect Transistor), or GTO (Gate Turn Off thyristor) may be used in place of the IGBT.

The diode D1 is connected between emitter and collector of the switching device Q1, so that feedback current can flow from the emitter side to the collector side of the switching device Q1. Similarly, the diode D2 is connected between emitter and collector of the switching device Q2, so that feedback current can flow from the emitter side to the collector side of the switching device Q2.

The reactor L1 is interposed between the connection point between the switching device Q1 and the switching device Q2, and the positive line ML, and repeats storage and release of electromagnetic energy, using electric current produced according to the switching operation of the switching devices Q1 and Q2. Namely, the converter CONV is operable to perform step-up operation or step-down operation (i.e., raise or lower voltage), through storage and release of electromagnetic energy at the reactor L1.

The capacitor C2 is connected between the main positive line PL and the main negative line NL, and smoothens DC power supplied and received between the converter CONV and the inverter INV. Namely, the capacitor C2 functions as a power buffer.

The inverter INV performs power conversion between the converter CONY and the motor-generator MG. Namely, the inverter INV is able to convert DC power supplied from the converter CONV via the main positive line PL and the main negative line NL, into three-phase AC power having three phase voltages (U-phase voltage, V-phase voltage, and W-phase voltage). The inverter INV is also able to convert three-phase AC power supplied from the motor-generator MG into DC power. More specifically, the inverter INV includes a U-phase arm circuit 101, V-phase arm circuit 102, and a W-phase arm circuit 103.

The U-phase arm circuit 101 includes a switching device Q11 as an upper arm device, and a switching device Q12 as a lower arm device, which are connected in series between the main positive line PL and the main negative line NL. The U-phase arm circuit 101 further includes diodes D11 and D12 that are in inverse-parallel connection with the switching devices Q11 and Q12, respectively. In the U-phase arm circuit 101, drive control circuits DC11 and DC12 control ON/OFF of the switching devices Q11 and Q12, respectively, according to a switching command PWM, so that switching operation is performed. Through the switching operation, the U-phase voltage developed at a connection point N1 is supplied to the motor-generator MG.

The diode D11 is connected between emitter and collector of the switching device Q11, so that feedback current can flow from the emitter side to the collector side of the switching device Q11. Similarly, the diode D12 is connected between emitter and collector of the switching device Q12, so that feedback current can flow from the emitter side to the collector side of the switching device Q12. Namely, the diodes D11 and D12 are in inverse-parallel connection with the switching devices Q11 and Q12, so as to permit electric current to flow from the main negative line NL to the main positive line PL, and inhibit current from flowing from the main positive line PL to the main negative line NL.

The diodes D11 and D12 as described above function to suppress surges that appear immediately after the switching devices Q11 and Q12 are turned from the ON state to the OFF state. Therefore, during normal switching operation, no current flows from the main positive line PL or main negative line NL into the diodes D11 and D12.

Similarly, the V-phase arm circuit 102 includes a switching device Q21 as an upper arm device, and a switching device Q22 as a lower arm device, which are connected in series between the main positive line PL and the main negative line NL. The V-phase arm circuit 102 further includes diodes D21 and D22 that are in inverse-parallel connection with the switching devices Q21 and Q22, respectively. In operation, the V-phase voltage developed at a connection point N2 in the V-phase arm circuit 102 is supplied to the motor-generator MG.

Similarly, the W-phase arm circuit 103 includes a switching device Q31 as an upper arm device, and a switching device Q32 as a lower arm device, which are connected in series between the main positive line PL and the main negative line NL. The W-phase arm circuit 103 further includes diodes D31 and D32 that are in inverse-parallel connection with the switching devices Q31 and Q32, respectively. In operation, the W-phase voltage developed at a connection point N3 in the W-phase arm circuit 103 is supplied to the motor-generator MG.

Like the switching devices Q1 and Q2 as described above, any of IGBT, bipolar transistor, MOSFET, and GTO may be used as each of the switching devices Q11-Q32. In this embodiment, IGBT is used, as one example.

In the V-phase arm circuit 102 and the W-phase arm circuit 103, too, drive control circuits DC21, DC22, DC31, DC32 control ON/OFF of the switching devices Q21, Q22, Q31, Q32, respectively, according to the switching command PWM.

The motor-generator MG generates driving force according to the three-phase AC power supplied from the inverter NV, and rotates/drives the driving wheels 82 mechanically coupled to the motor-generator MG via the automatic transmission 500.

A current sensor 107 detects current (which will also be called "phase current") that flows through each phase of the motor-generator MG. The current sensors 107 are provided for at least two phases of the U phase, V phase and W phase. The ECU 1000 receives the phase current detected by the current sensor 107. Since the sum of instantaneous values of phase current values Iu, Iv, Iw is equal to zero, the ECU 1000 is able to calculate the current of the phase for which the current sensor 107 is not provided. For example, in FIG. 1, the phase current Iw can be obtained according to an equation that Iw=−(Iu+Iv). However, the current sensor 107 may be provided for each phase, for improvement in the reliability.

The ECU 1000 creates the switching commands PWC, PWM used for controlling the switching operation of the converter CONV and inverter INV (namely, ON/OFF of each of the switching devices Q1, Q2, Q11-Q32), based on each phase current detected by the current sensor 107, and the MG rotational speed Nm detected by the resolver 22 (see FIG. 1).

Figure 3:
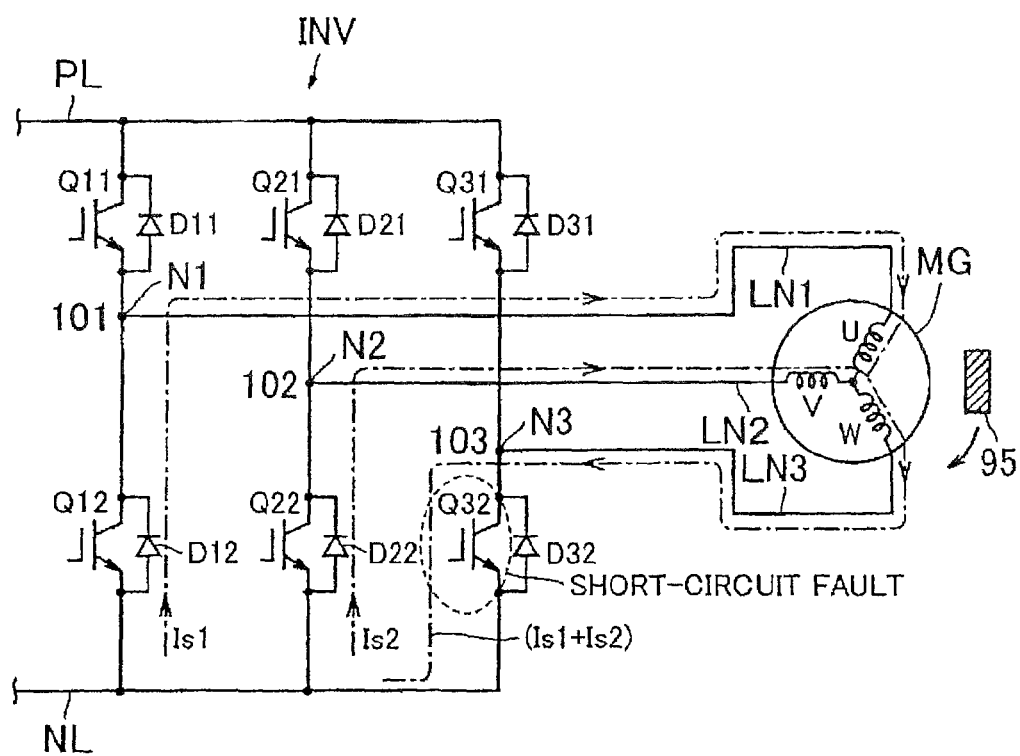
FIG. 3 is a view showing flow of short-circuit current when the inverter fails, in the first embodiment.

FIG. 3 shows flow of short-circuit current when a short-circuit fault occurs in the inverter INV. In FIG. 3, an all-gate turn-off command is generated to the inverter NV. The all-gate turn-off command, which is generated from the ECU 1000 to the inverter INV, is a command for turning off gates of all of the switching devices Q11-Q13 of the inverter NV. FIG. 3 shows an example in which a short-circuit fault occurs to the lower arm device (switching device Q32) of the W phase, and the remaining switching devices (Q11, Q12, Q21, Q22, Q31) are normal. Accordingly, in FIG. 3, the switching devices other than the switching device Q32 are in gate turn-off conditions according to the above command.

While the vehicle is running (namely, while the driving wheels 82 are rotating), the automatic transmission 500 is normally in the engaged state, and therefore, the rotor of the motor-generator MG rotates in accordance with the rotation of the driving wheels 82. The permanent magnets are mounted in the rotor of the motor-generator MG. Therefore, changes of magnetic flux with time and position are produced within the motor-generator MG, in accordance with rotation of the rotor, and back electromotive force proportional to the rotational speed of the motor-generator MG (rotational speed of the rotor) is produced. As the rotational speed of the motor-generator MG is higher, the back electromotive force produced in the motor-generator MG becomes higher.

If a short-circuit fault occurs in the switching device Q32 of the W-phase arm circuit 103, as shown in FIG. 3, short-circuit current Is1 flows through a current pathway (short-circuit pathway) including the U-phase arm circuit 101, motor-generator MG, and the W-phase arm circuit 103, due to the back electromotive force of the motor-generator MG. Namely, since the inverse-parallel diode D12 of the U-phase arm circuit 101 permits electric current to flow from the main negative line NL side toward the main positive line PL side, current can flow from the main negative line NL to a U-phase supply line LN1 via the connection point N1. Also, since the switching device Q32 is in a short-circuit condition, short-circuit current can flow from a W-phase supply line LN3 to the main negative line NL via the connection point N3. As a result, the short-circuit current Is1 flows through the main negative line NL, diode D12, connection point N1, U-phase supply line LN1, U-phase coil of the motor-generator MG, W-phase coil of the motor-generator MG, W-phase supply line LN3, connection point N3, switching device Q32, and the main negative line NL, in the order of description.

Similarly, short-circuit current Is2 flows through a current pathway including the V-phase arm circuit 102, motor-generator MG, and the W-phase arm circuit 103. Namely, the short-circuit current Is2 flows through the main negative line NL, diode D22, connection point N2, V-phase supply line LN2, V-phase coil of the motor-generator MG, W-phase coil of the motor-generator MG, W-phase supply line LN3, connection point N3, switching device Q32, and the main negative line NL, in the order of description.

Accordingly, a sum current of the short-circuit current Is1 and the short-circuit current Is2 flows through the switching device Q32.

If the vehicle 1 is kept running in this condition, excessively large short-circuit current flows continuously; therefore, the respective phase coils of the motor-generator MG, diodes that lie in the short-circuit pathways, supply lines (e.g., wiring harness) that connect the inverter INV with the motor-generator MG, and so forth may be damaged. Accordingly, when excessively large current flowing through the motor-generator MG is detected, it is desirable to determine whether the flow of the current is caused by a short-circuit fault in the inverter INV, and perform fail-safe control (e.g., control that suppresses short-circuit current) as needed, according to the result of the determination.

As a method of determining the presence or absence of a short-circuit fault in the inverter INV, it may be considered to determine that a short-circuit fault occurs in the inverter INV when phase current flows while the all-gate turn-off command is generated to the inverter INV (in the case as shown in FIG. 3). However, according to this method, the presence or absence of a short-circuit fault may not be accurately determined, in a region where the MG rotational speed Nm is high.

FIG. 4 shows the relationship among the presence or absence of a short-circuit fault in the inverter INV, the rotational speed region of the motor-generator MG and phase current at the time when the all-gate turn-off command is generated to the inverter INV. In FIG. 4, a rotational speed region in which the back electromotive force of the motor-generator MG is equal to or lower than DC voltage (voltage between the main positive line PL and the main negative line NL) applied to the inverter INV is denoted as "low rotational speed region R1", and a rotational speed region in which the back electromotive force is higher than the DC voltage is denoted as "high rotational speed region R2".

In the low rotational speed region R1, phase current flows when a short-circuit fault occurs in one phase of the inverter INV, but no phase current flows when the inverter NV is normal. Namely, when a short circuit occurs to one phase of the inverter INV, phase current flows through the short-circuit pathway as shown in FIG. 3, even when the all-gate turn-off command is generated. On the other hand, when the inverter INV is normal, no phase current flows under the all-gate turn-off command. Accordingly, in the low rotational speed region R1, it is possible to determine the presence or absence of a short-circuit fault in the inverter INV by determining the presence or absence of phase current. Namely, the low rotational speed region R1 is a rotational speed region in which it can be determined whether a short-circuit fault occurs in the inverter INV, based on the presence or absence of phase current.

In the high rotational speed region R2, however, phase current flows not only when a short-circuit fault occurs in one phase of the inverter INV, but also when the inverter NV is normal. Namely, since the back electromotive force is higher than the DC voltage in the high rotational speed region R2, the potentials of the connection points N1, N2, N3 become higher than the potential of the main positive line PL. With the back electromotive force thus produced, a current pathway through which current flows from the motor-generator MG toward the main positive line PL via any of the upper diodes D11, D21, D31 of the inverter NV is formed. For example, current that flows from the lower diodes D12, D22 of the U, V phases of the inverter NV into the motor-generator MG flows from the motor-generator MG to the main positive line PL, via the upper diode D31 of the W phase of the inverter NV.

Thus, in the high rotational speed region R2 in which the back electromotive force is higher than the DC voltage, the phase current flows not only when a short-circuit fault occurs in one phase of the inverter NV but also when the inverter INV is normal. Accordingly, in the high rotational speed region R2, it cannot be determined whether a short-circuit fault occurs in the inverter INV, based on the presence or absence of phase current.

Thus, when an abnormality (which will be called "overcurrent abnormality") that phase current exceeds a permissible value occurs in the high rotational speed region R2 shown in FIG. 4, the ECU 1000 of this embodiment performs control (which will also be called "reduction control") for reducing the rotational speed of the motor-generator MG. Then, the ECU 1000 determines that a short-circuit fault occurs in the inverter INV, when phase current is detected even when the all-gate turn-off command is generated to the inverter INV, while the rotational speed of the motor-generator MG is reduced to be within the low rotational speed region R1 shown in FIG. 4 under the reduction control.

Figure 5:
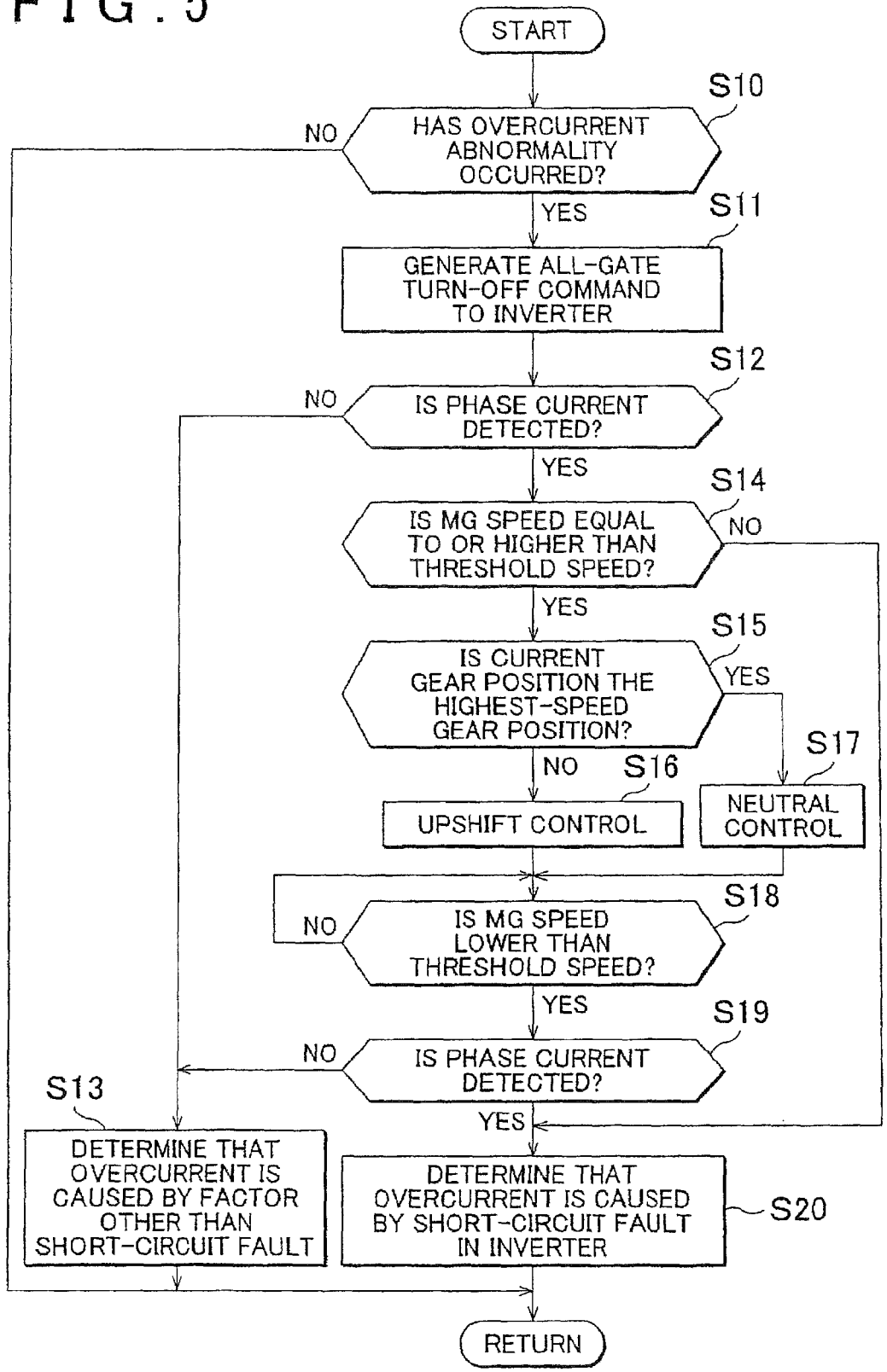
FIG. 5 is a flowchart illustrating a fault determination routine according to the first embodiment.

FIG. 5 is a flowchart illustrating a control routine of determining a fault in the inverter INV. The routine of FIG. 5 is repeatedly executed at given intervals.

In step S10, the ECU 1000 determines whether an overcurrent abnormality has occurred. The ECU 1000 determines that an overcurrent abnormality has occurred when any of the phase currents detected by the current sensors 107 exceeds a permissible value. In the case where a circuit for transmitting a signal indicating that any of the phase currents exceeds the permissible value, to the ECU 1000, is provided, in place of or in addition to the current sensors 107, the ECU 1000 may determine that an overcurrent abnormality has occurred when it receives the signal from the circuit.

If no overcurrent abnormality occurs (NO in step S10), the ECU 1000 finishes this cycle of the routine.

If an overcurrent abnormality has occurred (YES in step S10), the ECU 1000 outputs an all-gate turn-off command to the inverter INV (S11).

In this embodiment, when the all-gate turn-off command is generated to the inverter INV, a stop command (command to turn off both of the switching devices Q1, Q2 of the converter CONV) is generated to the converter CONV. As a result, the converter CONV stops raising and lowering the voltage, and the output voltage of the power storage device BAT is applied as it is to the inverter INV via the converter CONY.

Then, the ECU 1000 determines whether phase current is detected (S12). If no phase current flows (NO in step S12), it may be considered that the inverter INV is normal (see FIG. 4), and therefore, the ECU 1000 determines that the overcurrent abnormality occurred due to a factor other than a short-circuit fault in the inverter INV (S13).

If, on the other hand, phase current flows (YES in step S12), the ECU 1000 determines whether the MG rotational speed Nm is equal to or higher than a threshold speed (S14). The "threshold speed" is determined based on the MG rotational speed Nm obtained when the back electromotive force produced in the motor-generator MG is equal to the DC voltage applied from the converter CONV to the inverter INV. For example, the "threshold speed" may be a variable value that is calculated according to the detection value of the DC voltage, or may be a fixed value determined based on the DC voltage (i.e., the output voltage of the power storage device BAT) obtained when the converter CONV stops raising or lowering the voltage.

If the MG rotational speed Nm is lower than the threshold speed (NO in step S14), namely, if the MG rotational speed Nm falls within the low rotational speed region R1 shown in FIG. 4, it may be considered that a short-circuit fault occurs in one phase of the inverter INV (see FIG. 4); therefore, the ECU 1000 determines that the overcurrent abnormality occurred due to the short-circuit fault in the inverter INV (S20).

When the MG rotational speed Nm is equal to or higher than the threshold speed (YES in step S14), namely, when the MG rotational speed Nm falls within the high rotational speed region R2 shown in FIG. 4, the ECU 1000 performs reduction control in the following steps S15-S17, so as to reduce the MG rotational speed Nm.

Initially, the ECU 1000 determines whether the current gear position of the automatic transmission 500 is the highest-speed gear position (4th-speed gear position in this embodiment) (S15).

If the current gear position is not the highest-speed gear position (NO in step S15), the ECU 1000 performs upshift control (S16). The upshift control is control for changing the gear position to the higher-speed gear position (so as to reduce the speed ratio). For example, when the current gear position is the 3rd-speed gear position, the gear position is changed to the 4th-speed gear position that is on the higher-speed side of the 3rd-speed gear position. With the upshift control thus performed, the speed ratio of the automatic transmission 500 (namely, the ratio of the MG rotational speed Nm to the vehicle speed V) is reduced, so that the MG rotational speed Nm can be quickly reduced even at the same vehicle speed V.

If there are two or more gear positions that are on the higher-speed side of the current gear position, a target gear position to be established by the upshift control may be selected as appropriate. For example, the automatic transmission 500 may be sequentially shifted up by one gear at a time until the MG rotational speed Nm falls within the low rotational speed region R1. It is also possible to predict, for each gear position, whether the MG rotational speed Nm reached after upshifting falls within the low rotational speed region R1, and shift up the automatic transmission 500 to a gear position that is closest to the current gear position (and gives rise to the smallest shift shock), out of the gear positions for which it is predicted that the NG rotational speed Nm after upshifting falls within the low rotational speed region R1.

If the current gear position is the highest-speed gear position (YES in step S15), namely, if the upshift control cannot be performed, the ECU 1000 performs neutral control (S17). The neutral control is control for placing the automatic transmission 500 into a released state (neutral state). With the neutral control thus performed, the driving wheels 82 and the motor-generator MG are mechanically disconnected from each other, and therefore, the MG rotational speed Nm can be naturally reduced irrespective of the vehicle speed V.

The upshift control performed in step S16 or the neutral control performed in step S17 is the "reduction control" according to this embodiment.

Figure 6:
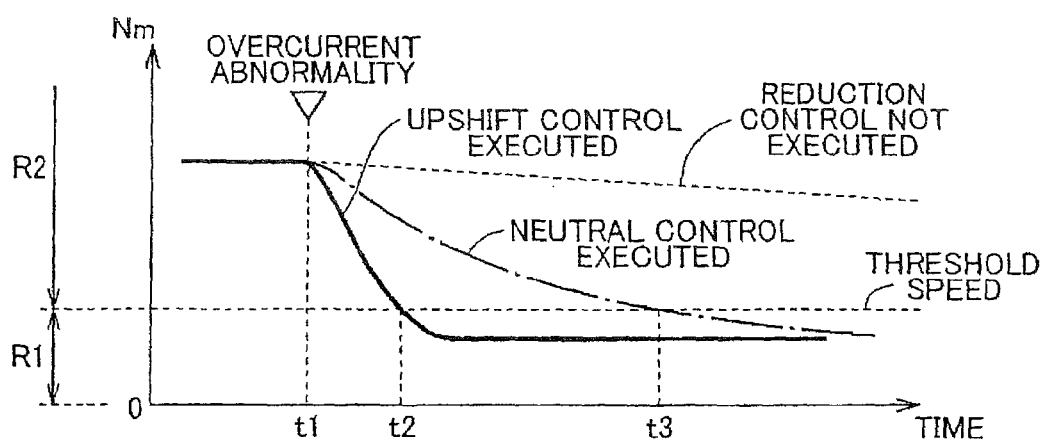
FIG. 6 is a view schematically showing the manner of reducing the MG rotational speed Nm under reduction control according to the first embodiment.

FIG. 6 schematically shows the manner of reducing the MG rotational speed Nm under the reduction control (upshift control or neutral control).

At time t1 at which an overcurrent abnormality occurs, if the MG rotational speed Nm falls within the high rotational speed region R2, the reduction control is performed.

If the upshift control is performed as the reduction control, the MG rotational speed Nm is quickly reduced down to the synchronous rotational speed to be reached after upshifting (see the solid line in FIG. 6). As a result, the MG rotational speed Nm can be reduced to be within the low rotational speed region R1 at an earlier time, as compared with the case (as indicated by the broken line in FIG. 6) where the reduction control is not performed.

If the neutral control is performed as the reduction control, the driving wheels 82 and the motor-generator MG are mechanically disconnected from each other, and therefore, the MG rotational speed Nm can be naturally reduced irrespective of the vehicle speed V, even during running of the vehicle (i.e., during rotation of the driving wheels 82). As a result, the MG rotational speed Nm can be reduced to be within the low rotational speed region R1 at an earlier time, as compared with the case (as indicated by the broken line in FIG. 6) where the reduction control is not performed.

Under the upshift control, the MG rotational speed Nm can be forced to be reduced down to the synchronous rotational speed to be reached after upshifting; therefore, the MG rotational speed Nm can be reduced to be within the low rotational speed region R1 at an earlier time, as compared with the neutral control (see time t2, t3 of FIG. 4).

Referring back to FIG. 5, the ECU 1000 determines whether the MG rotational speed Nm has been reduced to be lower than the threshold speed, due to the reduction control, namely, whether the MG rotational speed Nm has been reduced to be within the low rotational speed region R1 shown in FIG. 4 (S18).

If the MG rotational speed Nm is not lower than the threshold speed (NO in step S18), the ECU 100 waits until the MG rotational speed Nm becomes lower than the threshold speed.

If the MG rotational speed Nm becomes lower than the threshold speed (YES in step S18), the ECU 1000 determines the presence or absence of phase current (S19). During execution of this step (S19), the all-gate turn-off command generated in step S11 is maintained.

If no phase current flows (NO in step S19), it may be considered that the inverter INV is normal (see FIG. 4); therefore, the ECU 100 determines that the overcurrent abnormality occurred due to a factor other than a short-circuit fault in the inverter INV (S13).

If, on the other hand, phase current flows (YES in step S19), it may be considered that a short-circuit fault occurs in one phase of the inverter INV (see FIG. 4); therefore, the ECU 1000 determines that the overcurrent abnormality occurred due to the short-circuit fault in the inverter NV (S20).

The ECU 1000 performs necessary fail-safe control according to the result of the fault determination routine. For example, if it is determined that a short-circuit fault occurs in one phase of the inverter INV, the ECU 1000 performs fail-safe control to permit driving of the motor-generator MG while controlling short-circuit current to be less than a permissible value, by appropriately controlling ON/OFF of the remaining normal switching devices of the inverter INV. In this manner, the vehicle 1 is able to run in a limp-home mode.

As described above, when an overcurrent abnormality occurs in the high rotational speed region R2, the ECU 1000 of this embodiment reduces the MG rotational speed Nm to be within the low rotational speed region R1 through the reduction control. Therefore, it is possible to bring about, at an earlier time, a condition where it can be determined whether a short-circuit fault occurs in the inverter NV, based on the presence or absence of overcurrent.

Next, a modified example of the first embodiment will be described. The above-described first embodiment may be modified as follows. In the above-described first embodiment, the neutral control for placing the automatic transmission 500 in the released state is performed as the reduction control. However, the neutral control may be replaced by slip control for placing the automatic transmission 500 in a slipping state. With the automatic transmission 500 thus placed in the slipping state, the driving wheels 82 and the motor-generator MG are not fully or completely coupled to each other; therefore, the MG rotational speed Nm can be reduced irrespective of the vehicle speed V.

In the above-described first embodiment, one of the upshift control and the neutral control can be selected as the reduction control. However, only one of the upshift control and the neutral control may be performed. For example, in the arrangement in which a clutch device, rather than the automatic transmission 500, is provided between the motor-generator MG and the driving wheels 82, only the neutral control for placing the clutch device in a released state may be performed as the reduction control. Alternatively, only slip control for placing the clutch device in a slipping state may be performed as the reduction control.

In the first embodiment, upshift control is carried out using the automatic transmission 500 having two or more gear positions. However, upshift control may also be carried out using a continuously variable transmission (CVT). When the continuously variable transmission is used, the speed ratio may be continuously changed to the higher-speed side.

Next, a second embodiment of the invention will be described. In the above-described first embodiment, this invention is applied to the electric vehicle. In the second embodiment, this invention is applied to a hybrid vehicle.

Figure 7:
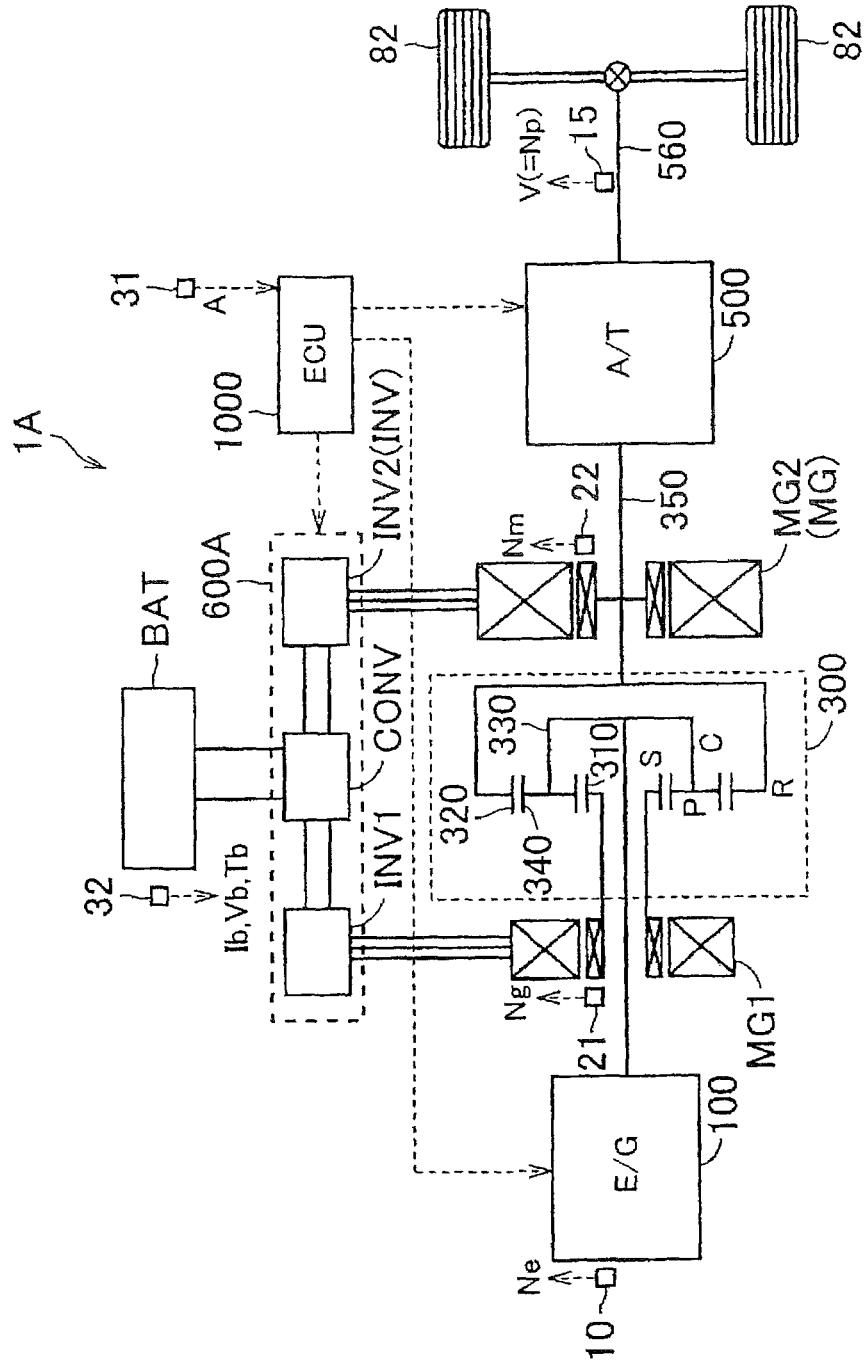
FIG. 7 is an overall block diagram of a vehicle according to a second embodiment of the invention.

FIG. 7 is an overall block diagram of a vehicle 1A according to the second embodiment. The vehicle 1A includes an engine (E/G) 100, first motor-generator MG1, power split device 300, second motor-generator MG2, automatic transmission 500, PCU 600A, power storage device BAT, and ECU 1000. In the overall block diagram of FIG. 7, blocks or components having the same numerals or symbols as those shown in FIG. 1 have substantially the same configurations as those of the first embodiment as described above, and therefore, will not be repeatedly described in detail.

The vehicle 1A is a hybrid vehicle that runs with power of at least one of the engine 100 and the second motor-generator MG2 rotating the driving wheels 82. Namely, the vehicle 1A has another power source (engine 100), in addition to the power source (motor-generator MG) of the vehicle 1 according to the above-described first embodiment. Namely, the second motor-generator MG2 of the vehicle 1A corresponds to the motor-generator MG of the first embodiment.

The power generated by the engine 100 is transmitted to the power split device 300. The power split device 300 divides the power received from the engine 100, into power to be transmitted to the driving wheels 82 via the automatic transmission 500, and power to be transmitted to the first motor-generator MG1.

The power split device 300 has a planetary gear mechanism including a sun gear (S) 310, a ring gear (R) 320, a carrier (C) 330, and a pinion (P) 340. The sun gear (S) 310 is coupled to the rotor of the first motor-generator MG1. The ring gear (R) is coupled to the driving wheels 82 via the automatic transmission 500. The pinion (P) 340 meshes with the sun gear (S) 310 and the ring gear (R) 320. The carrier (C) 330 holds the pinion (P) such that the pinion (P) can freely rotate about itself and about the axis of the power split device 300. The carrier (C) 330 is coupled to the crankshaft of the engine 100.

The first motor-generator MG1 (which will also be simply denoted as "MG1") and the second motor-generator MG2 (which will also be simply denoted as "MG2") are AC rotating electric machines, and function as a motor and a generator. In this embodiment, the MG2 is provided between the power split device 300 and the automatic transmission 500. Namely, the rotor of the MG2 is connected to a rotary shaft 350 that couples the power split device 300 with the automatic transmission 500. The configuration of the MG1 and MG2 is the same as that of the motor-generator MG as described above in the first embodiment. As described above, the MG2 corresponds to the motor-generator MG of the first embodiment.

An input shaft of the automatic transmission 500 is connected to the ring gear (R) of the power split device 300 and the rotor of the MG2, via the rotary shaft 350.

The PCU 600A converts DC power supplied from the power storage device BAT into AC power, and delivers the AC power to the MG1 and/or the MG2. Also, the PCU 600 converts AC power generated by the MG1 and/or the MG2 into DC power, and delivers the DC power to the power storage device BAT.

The PCU 600A includes a converter CONV, a first inverter INV1, and a second inverter INV2. The configuration of the converter CONV is substantially the same as that of the first embodiment as described above.

The first inverter INV1 and the second inverter INV2 are connected in parallel with the converter CONV. The first inverter INV1 performs power conversion between the converter CONV and the MG1. The second inverter INV2 performs power conversion between the converter CONV and the MG2. The configuration of the first inverter INV1 and the second inverter INV2 is substantially the same as that of the inverter INV of the first embodiment as described above.

The vehicle 1A includes an engine speed sensor 10, and a resolver 21, in addition to the vehicle speed sensor 15, resolver 22, accelerator position sensor 31, and the monitoring sensor 32. The engine speed sensor 10 detects the rotational speed of the engine 100 (which will be called "engine speed Ne"). The resolver 21 detects the rotational speed of the MG1 (which will be called "first MG rotational speed Ng"). The resolver 22 detects the rotational speed of the MG2 (which will be called "second MG rotational speed Nm"). These sensors output detection results to the ECU 1000.

The ECU 1000 determines required driving power from the accelerator pedal position A and the vehicle speed V, and controls the engine 100 and the PCU 600A (MG1, MG2) according to certain algorithms, so as to provide the required driving power thus determined.

Figure 8:
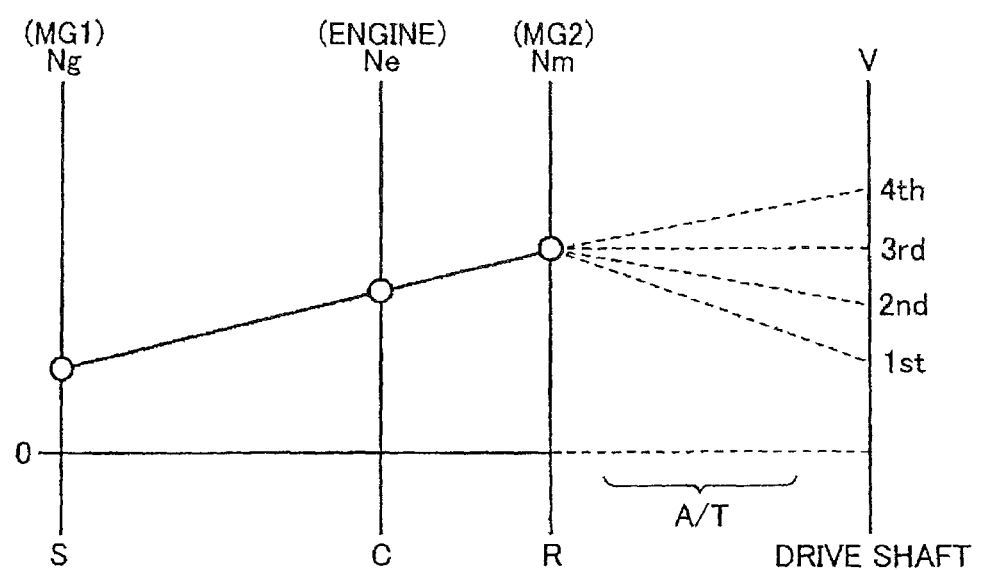
FIG. 8 is a nomographic chart of a power split device in the second embodiment.

FIG. 8 is a nomographic chart of the power split device 300. As shown in FIG. 8, the rotational speed of the sun gear (S) 310 (i.e., the MG1 rotational speed Ng), the rotational speed of the carrier (C) 330 (i.e., the engine speed Ne), and the rotational speed of the ring gear (R) 320 (i.e., the MG2 rotational speed Nm) have a relationship as indicated by a straight line on the nomographic chart of the power split device 300. According to the relationship, if two of the three rotational speeds are determined, the remaining rotational speed is determined. The ratio between the MG2 rotational speed Nm and the vehicle speed V is determined by the gear position (speed ratio) formed by the automatic transmission 500. In FIG. 8, the relationship between the MG2 rotational speed Nm and the vehicle speed V when the automatic transmission 500 forms any forward-drive gear position selected from the 1st-speed to 4th-speed gear positions is indicated by a broken line.

The ECU 1000 of this embodiment reduces the rotational speed of the motor-generator in which an overcurrent abnormality occurs (which will be called "overcurrent MG"), through the reduction control, as in the first embodiment as described above. While one of the "upshift control" and the "neutral control" is selected as the reduction control in the above-described first embodiment, "neutral regeneration control" is added, as a choice of reduction control, to these controls in the second embodiment. The "neutral regeneration control" is control for reducing the rotational speed of the overcurrent MG using regenerative torque of the motor-generator in which no overcurrent abnormality occurs (which will be called "non-overcurrent MG") while the automatic transmission 500 is placed in a released state (neutral state).

Figure 9A:
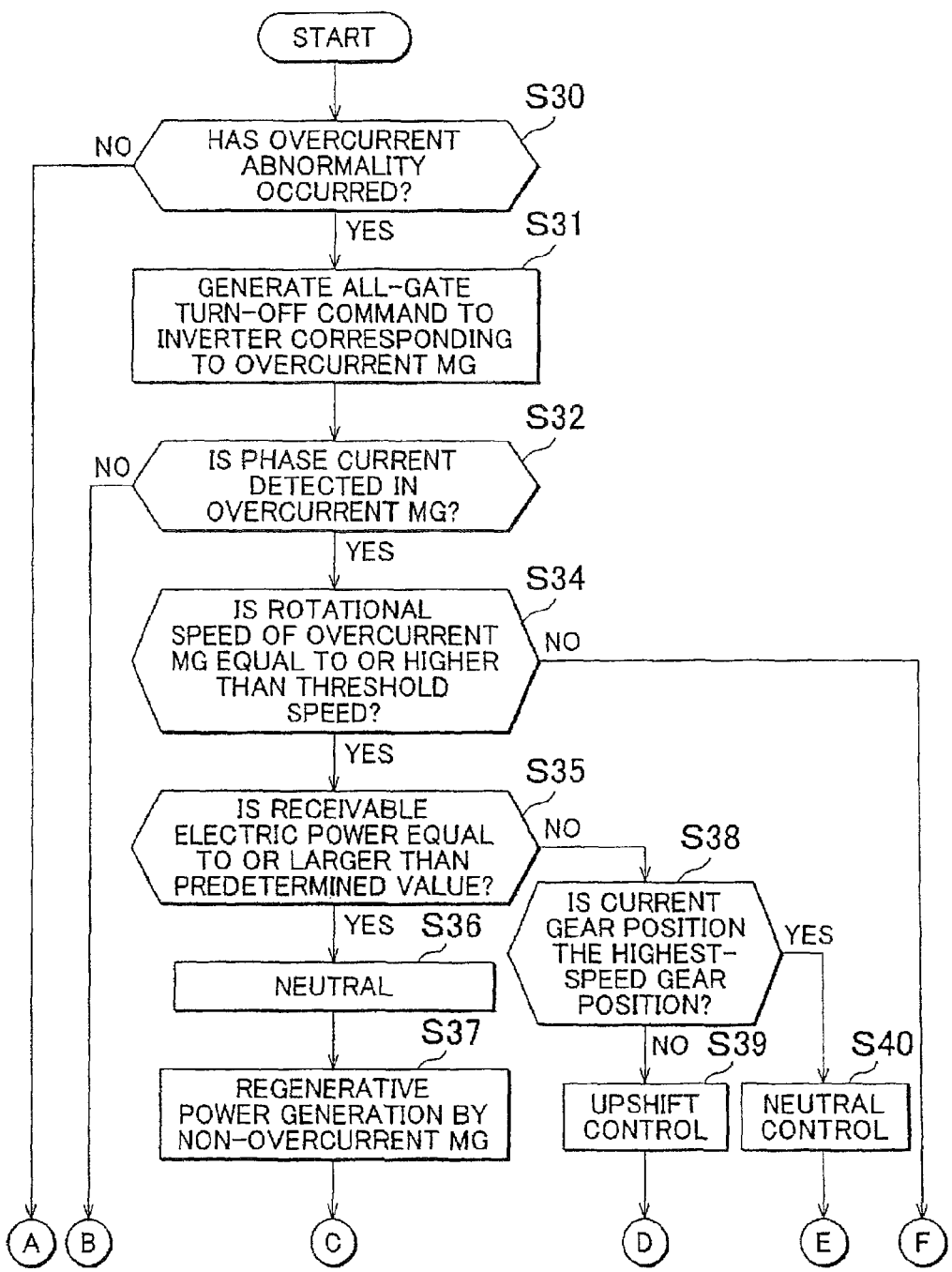
FIG. 9A and FIG. 9B are flowcharts illustrating a fault determination routine according to the second embodiment.
Figure 9B:
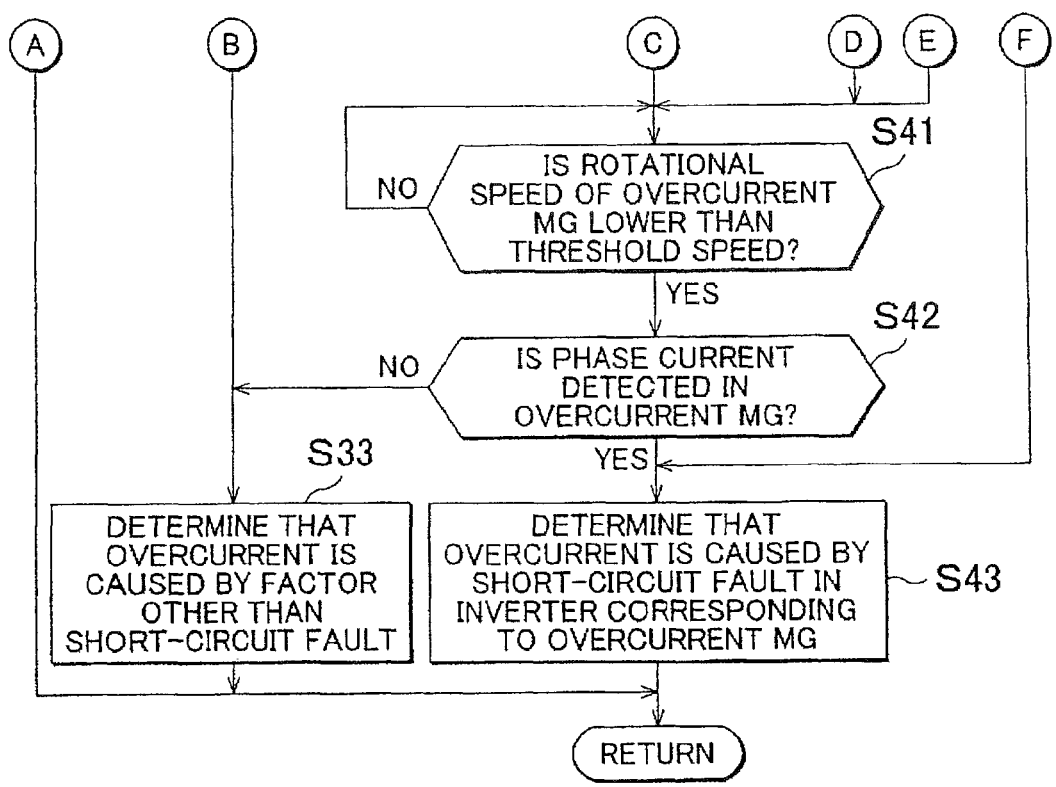

FIG. 9A and FIG. 9B are flowcharts illustrating a fault determination routine according to this embodiment. The routines of FIG. 9 and FIG. 9B are repeatedly executed at given intervals.

In step S30, the ECU 1000 determines whether an overcurrent abnormality occurs to the MG1 or the MG2. If no overcurrent abnormality occurs in both of the MG1 and the MG2 (NO in step S30), the ECU 1000 finishes this cycle of the routine.

If an overcurrent abnormality occurs to the MG1 or the MG2 (YES in step S30), the ECU 1000 outputs an all-gate turn-off command to the inverter corresponding to the overcurrent MG (S31). Then, the ECU 1000 determines whether phase current flows through the overcurrent MG (S32).

If no phase current flows through the overcurrent MG (NO in step S32), it may be considered that the inverter corresponding to the overcurrent MG is normal (see FIG. 4); therefore, the ECU 1000 determines that the overcurrent abnormality occurred due to a factor other than a short-circuit fault in the inverter corresponding to the overcurrent MG (S33).

If, on the other hand, phase current flows through the overcurrent MG (YES in step S32), the ECU 1000 determines whether the rotational speed (absolute value) of the overcurrent MG is higher than the threshold speed, namely, whether the rotational speed of the overcurrent MG falls within the high rotational speed region R2 shown in FIG. 4 (S34). If the rotational speed obtained when the back electromotive force becomes equal to the DC voltage is different between the MG1 and the MG2, the "threshold speed" is set to different values between the case where the overcurrent MG is MG1, and the case where the overcurrent MG is MG2.

If the rotational speed of the overcurrent MG is lower than the threshold speed (NO in step S34), namely, if the rotational speed of the overcurrent MG falls within the low rotational speed region R1 shown in FIG. 4, it may be considered that a short-circuit fault occurs in one phase of the inverter corresponding to the overcurrent MG (see FIG. 4); therefore, the ECU 100 determines that the overcurrent abnormality occurred due to the short-circuit fault in the inverter corresponding to the overcurrent MG (S43).

If, on the other hand, the rotational speed of the overcurrent MG is equal to or higher than the threshold speed (YES in step S34), namely, if the rotational speed of the overcurrent MG falls within the high rotational speed region R2 shown in FIG. 4, the ECU 1000 performs reduction control in the following steps S35-S40, so as to reduce the MG rotational speed Nm.

Initially, the ECU 1000 determines whether electric power WIN that can be received by the power storage device BAT is equal to or larger than a predetermined value (S35). This determination is made so as to predict whether regenerative power generated through neutral regeneration control (of steps S36 and S37 which will be described later) can be received by the power storage device BAT.

If the power WIN that can be received by the power storage device BAT is equal to or larger than the predetermined value (YES in step S35), the ECU 1000 performs neutral regeneration control (S36, S37) as the reduction control. Namely, the ECU 1000 places the automatic transmission 500 in the released state (neutral state) in step S36, and controls the non-overcurrent MG to place it in a regenerative power generation state in step S37.

Figure 10:
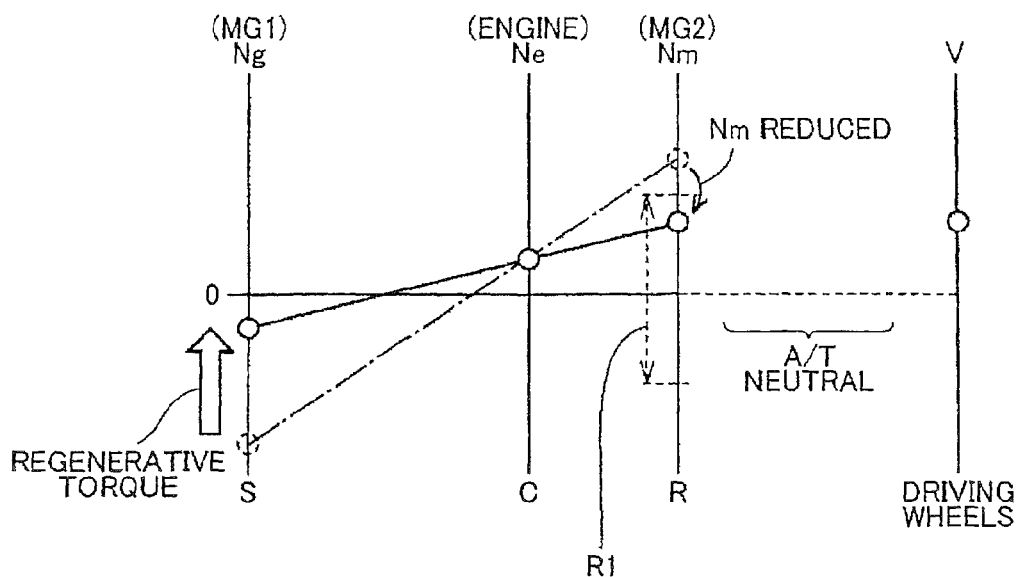
FIG. 10 is a view showing one example of rotational speed changes under neutral regeneration control according to the second embodiment.

FIG. 10 is a nomographic chart schematically showing one example of rotational speed changes under neutral regeneration control. FIG. 10 shows the case where the MG2 is the overcurrent MG.

As shown in FIG. 10, during neutral regeneration control, the automatic transmission 500 is controlled to be placed in the neutral state, and the driving wheels 82 and the MG2 are mechanically disconnected from each other. In this condition, the MG1 is controlled to be placed in the regenerative power generation state. The regenerative torque of the MG1 produced in this state is transmitted to the MG2 as torque that reduces the MG2 rotational speed Nm. Therefore, the MG2 rotational speed Nm can be quickly reduced. Further, the power storage device BAT is charged with the regenerative power of the MG1. Namely, under the neutral regeneration control, rotational energy of the MG2 is consumed as charging power of the power storage device BAT, so that the MG2 rotational speed Nm is reduced.

Referring back to FIG. 9A and FIG. 9B, when the electric power WIN that can be received by the power storage device BAT is smaller than the predetermined value (NO in step S35), namely, when it is predicted that the power storage device BAT cannot be charged with the regenerative power of the MG1 produced under the neutral regeneration control, the ECU 100 performs upshift control or neutral control, as the reduction control (S38-S40).

Initially, the ECU 1000 determines whether the current gear position of the automatic transmission 500 is the highest-speed gear position (S38). If the current gear position is not the highest-speed gear position (NO in step S38), the ECU 1000 performs upshift control (S39). If the current gear position is the highest-speed gear position (YES in step S38), the ECU 1000 performs neutral control (S40).

Figure 11:
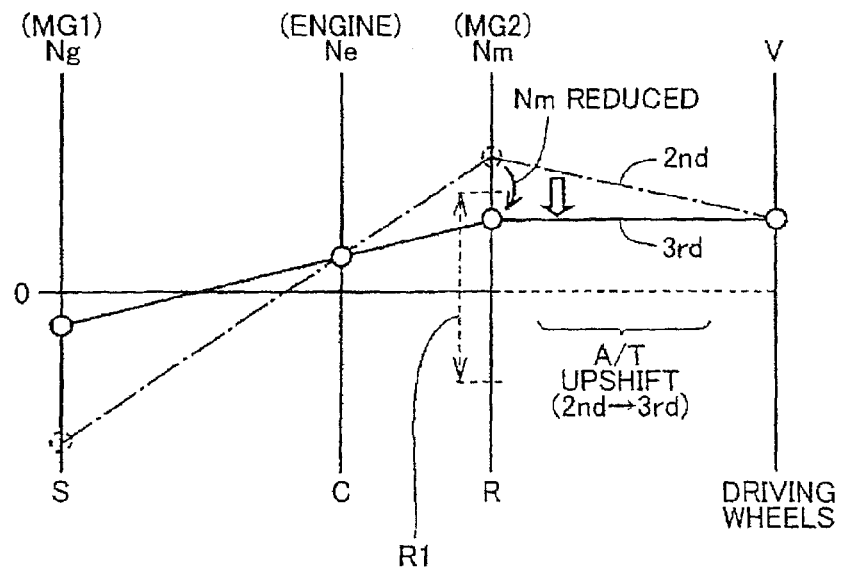
FIG. 11 is a view showing one example of rotational speed changes under upshift control according to the second embodiment.

FIG. 11 is a nomographic chart schematically showing one example of rotational speed changes under the upshift control. FIG. 11 shows an example in which overcurrent arises in the MG2 during running in the second-speed gear position, and the automatic transmission 500 is shifted up to the third-speed gear position.

As shown in FIG. 11, during upshifting, the vehicle speed V is fixed almost without changing. Therefore, it is possible to quickly reduce the MG2 rotational speed Nm, by reducing the speed ratio (the ratio of the input shaft rotational speed to the output shaft rotational speed) of the automatic transmission 500 through the upshift control. In the condition as shown in FIG. 11, the MG1 rotational speed Ng (absolute value) can also be reduced through the upshift control.

Referring back to FIG. 9A and FIG. 9B, after the reduction control (any of the neutral regeneration control, upshift control, and neutral control) is started, the ECU 1000 determines whether the rotational speed of the overcurrent MG has been reduced to be lower than the threshold speed, namely, whether the rotational speed of the overcurrent MG has been reduced to fall within the low rotational speed region R1 shown in FIG. 4 (S41).

If the rotational speed of the overcurrent MG has not been reduced to be lower than the threshold speed (NO in step S41), the ECU 1000 waits until the rotational speed of the overcurrent MG becomes lower than the threshold speed.

If the rotational speed of the overcurrent MG becomes lower than the threshold speed (YES in step S41), the ECU 100 determines the presence or absence of phase current in the overcurrent MG. In this step, too, the all-gate turn-off command issued in step S31 is maintained.

If no phase current flows in the overcurrent MG (NO in step S42), it may be considered that the inverter corresponding to the overcurrent MG is normal (see FIG. 4); therefore, the ECU 1000 determines that the overcurrent abnormality occurred due to a factor other than a short-circuit fault in the inverter corresponding to the overcurrent MG (S33).

If, on the other hand, phase current flows in the overcurrent MG (YES in step S42), it may be considered that a short-circuit fault occurs in one phase of the inverter corresponding to the overcurrent MG; therefore, the ECU 1000 determines that the overcurrent abnormality occurred due to the short-circuit fault in the inverter corresponding to the overcurrent MG (S43).

As described above, the present invention may be applied to a hybrid vehicle like the vehicle 1A. Namely, when an overcurrent abnormality occurs to the MG1 or the MG2, the ECU 1000 of this embodiment performs reduction control (any one of the neutral regeneration control, upshift control, and neutral control) so that the rotational speed of the overcurrent MG is reduced to be within the low rotational speed region R1. Therefore, it is possible to bring about, at an earlier time, a condition where it can be determined whether a short-circuit fault occurred in the inverter INV corresponding to the overcurrent MG, based on the presence or absence of overcurrent.

Next, a modified example of the second embodiment will be described. The above-described second embodiment may be modified as follows. While the upshift control is performed as one type of reduction control in the second embodiment as described above, downshift control may be performed instead of the upshift control when the automatic transmission 500 needs to be shifted down so as to reduce the MG1 rotational speed Ng (absolute value). The downshift control is control for changing the gear position to the lower-speed gear position (so as to increase the speed ratio).

Figure 12:
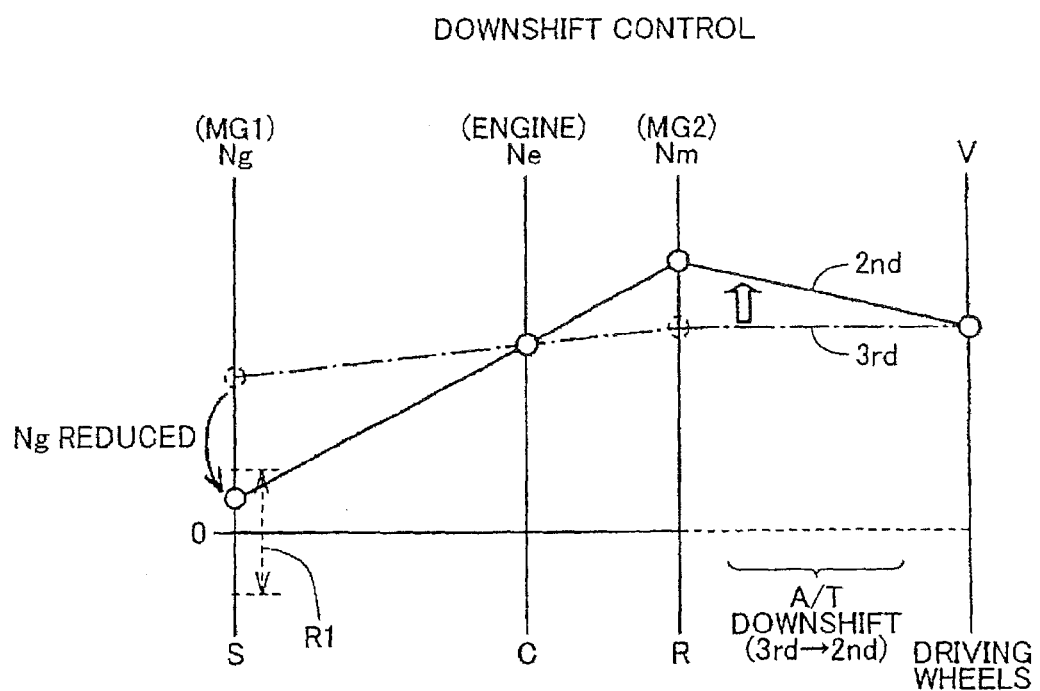
FIG. 12 is a view showing one example of rotational speed changes under downshift control according to the second embodiment.

FIG. 12 is a nomographic chart schematically showing one example of rotational speed changes under downshift control. As shown in FIG. 12, when both of the MG1 rotational speed Ng and the MG2 rotational speed Nm are positive values, it is possible to reduce the MG1 rotational speed Ng, by increasing the MG2 rotational speed Nm through the downshift control.

While this invention is applied to the hybrid vehicle configured like the vehicle 1A as shown in FIG. 7 in the second embodiment, the configuration of hybrid vehicles to which the invention may be applied is not limited to that of the vehicle 1A.

Figure 13:
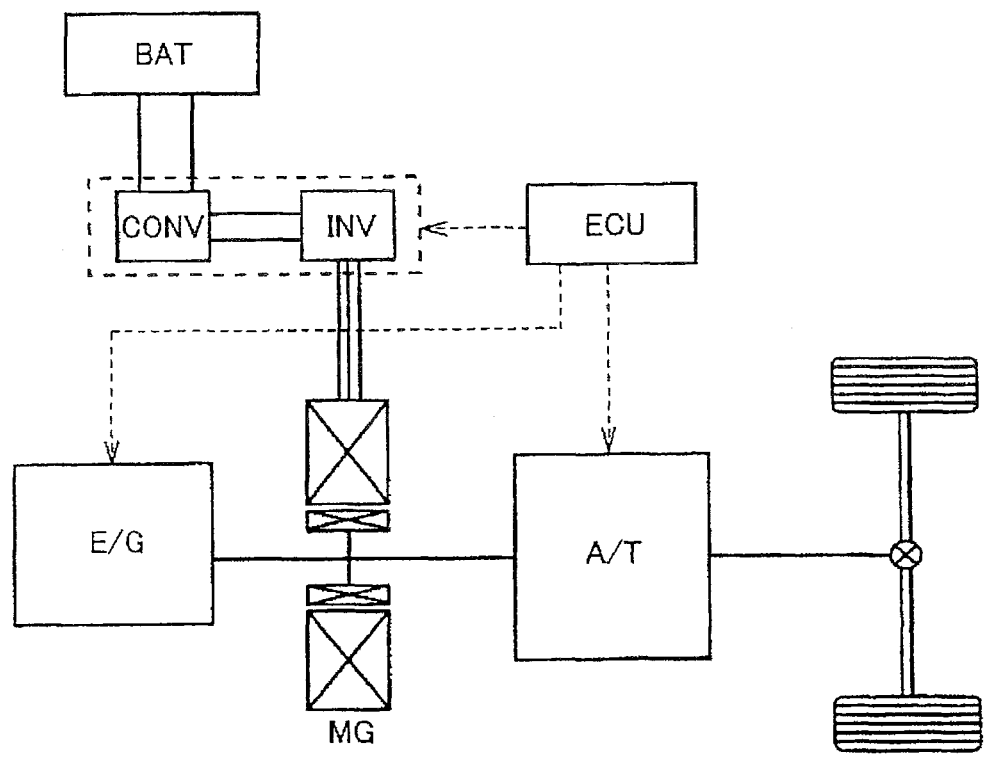
FIG. 13 is an overall block diagram of a vehicle as a modified example of the second embodiment.

For example, the vehicle 1A includes two motor-generators, but the number of motor-generators is not limited to two. For example, one motor-generator may be provided between the engine and the automatic transmission, as shown in FIG. 13.

Figure 14:
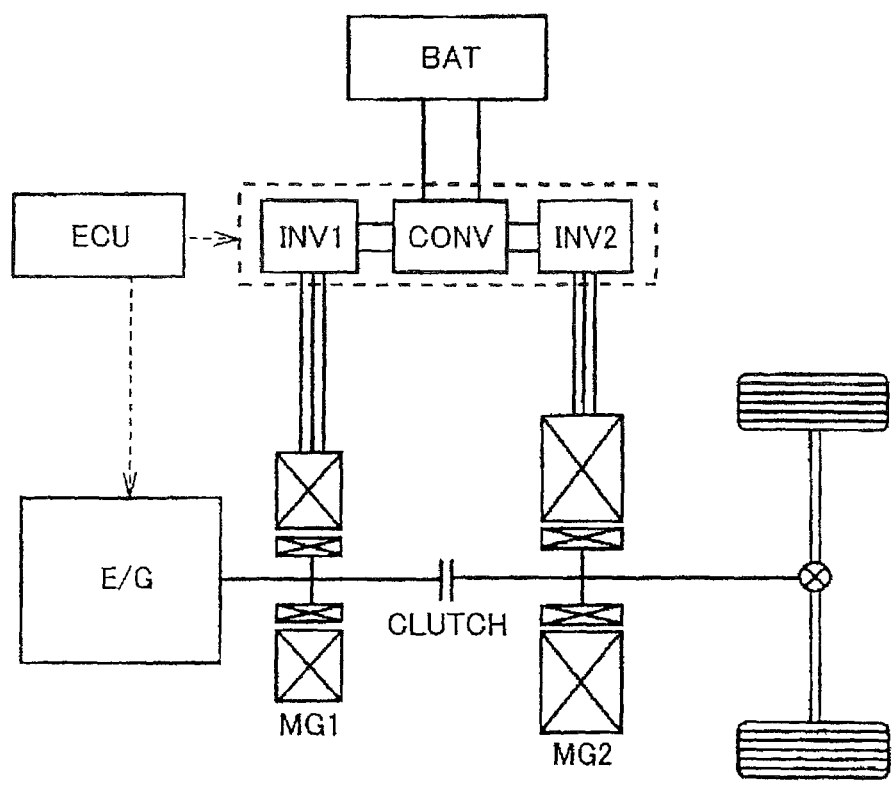
FIG. 14 is an overall block diagram of a vehicle as another modified example of the second embodiment.

While the vehicle 1A has the power split device 300 and the automatic transmission 500, these devices may not be provided. For example, as shown in FIG. 14, the engine, first motor-generator, and second motor-generator may be connected in series in this order and coupled to the driving wheels, and a clutch device may be provided between the two motor-generators. In the hybrid vehicle configured as shown in FIG. 14, this invention may be applied to the first motor-generator that can be disconnected from the driving wheels when the clutch device is released.

The above-described first and second embodiments and their modified examples may be combined as appropriate as long as the combination does not give rise to technical inconsistency.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle comprising:
    an AC rotating electric machine coupled to a wheel of the vehicle;
    an inverter configured to supply phase current to the rotating electric machine; and
    an electronic control unit configured to perform reduction control for reducing a rotational speed of the rotating electric machine, when the phase current exceeds a permissible value to bring about an overcurrent abnormality during rotation of the rotating electric machine, wherein
    the electronic control unit is configured to determine that a short-circuit fault occurs in the inverter, when the phase current flows in the rotating electric machine even when a command to bring the inverter into a gate turn-off state is generated while the rotational speed of the rotating electric machine is reduced to be lower than a threshold speed through the reduction control.

2. The vehicle according to claim 1, wherein
    the electronic control unit is configured to set the threshold speed, based on the rotational speed of the rotating electric machine obtained when back electromotive force produced in the rotating electric machine is equal to a DC voltage applied to the inverter.

3. The vehicle according to claim 2, wherein
    the threshold speed is a variable value calculated according to the DC voltage.

4. The vehicle according to claim 2, wherein
the threshold speed is a fixed value set based on the DC voltage that is not raised nor lowered when applied to the inverter.

5. A vehicle comprising:
an AC rotating electric machine coupled to a wheel of the vehicle;
an inverter configured to supply phase current to the rotating electric machine;
an electronic control unit configured to perform reduction control for reducing a rotational speed of the rotating electric machine, when the phase current exceeds a permissible value to bring about an overcurrent abnormality during rotation of the rotating electric machine; and
a clutch device provided between the rotating electric machine and the wheel, the clutch device being configured to be placed in a selected one of an engaged state, a released state, and a slipping state, wherein
the electronic control unit is configured to reduce the rotational speed of the rotating electric machine through the reduction control, by placing the clutch device in the released state or the slipping state.

6. A vehicle comprising:
an AC rotating electric machine coupled to a wheel of the vehicle;
an inverter configured to supply phase current to the rotating electric machine;
an electronic control unit configured to perform reduction control for reducing a rotational speed of the rotating electric machine, when the phase current exceeds a permissible value to bring about an overcurrent abnormality during rotation of the rotating electric machine; and
a speed change device provided between the rotating electric machine and the wheel, the speed change device being configured to change a speed ratio, the speed ratio being a ratio of the rotational speed of the rotating electric machine to a rotational speed of the wheel, wherein
the electronic control unit is configured to reduce the rotational speed of the rotating electric machine through the reduction control, by shifting up the speed change device so as to reduce the speed ratio of the speed change device.

7. A vehicle comprising:
an AC rotating electric machine coupled to a wheel of the vehicle;
an inverter configured to supply phase current to the rotating electric machine;
an electronic control unit configured to perform reduction control for reducing a rotational speed of the rotating electric machine, when the phase current exceeds a permissible value to bring about an overcurrent abnormality during rotation of the rotating electric machine,
wherein the AC rotating electric machine is a second rotational electric machine, and the inverter is a second inverter;
a first rotating electric machine coupled to the second rotating electric machine via a gear unit;
a first inverter configured to supply phase current to the first rotating electric machine;
a power storage device connected to the second rotating electric machine via the second inverter and connected to the first rotating electric machine via the first inverter; and a speed change device provided between one of the first rotating electric machine and the second rotating electric machine, and the wheel, the speed change device being configured to be placed in a selected one of an engaged state, a slipping state, and a released state, and the speed change device being configured to change a speed ratio of the speed change device in the engaged state,
wherein the electronic control unit is configured to:
i) reduce the rotational speed of said one of the first rotating electric machine and the second rotating electric machine in which the overcurrent abnormality occurs, through the reduction control, when the overcurrent abnormality occurs to one of the first rotating electric machine and the second rotating electric machine, and
ii) determine that a short-circuit fault occurs in the inverter corresponding to said one of the first rotating electric machine and the second rotating electric machine in which the overcurrent abnormality occurs, when phase current flows in said one of the first rotating electric machine and the second rotating electric machine even when a command to bring the inverter corresponding to said one of the first rotating electric machine and the second rotating electric machine into a gate turn-off condition is generated, while the rotational speed of said one of the first rotating electric machine and the second rotating electric machine is reduced to be lower than a threshold speed through the reduction control.

8. The vehicle according to claim 7, wherein
the electronic control unit is configured to set the threshold speed of the first rotating electric machine and the threshold speed of the second rotating electric machine, based on the rotational speed of the first rotating electric machine and the rotational speed of the second rotating electric machine obtained when back electromotive force is equal to a DC voltage applied to each of the first inverter and the second inverter, the back electromotive force is produced in the first rotating electric machine and the second rotating electric machine.

9. The vehicle according to claim 8, wherein
the threshold speed is a variable value calculated according to the DC voltage.

10. The vehicle according to claim 8, wherein
the threshold speed is a fixed value set based on the DC voltage that is not raised nor lowered when applied to each of the first inverter and the second inverter.

11. The vehicle according to claim 7, wherein:
the electronic control unit is configured to reduce the rotational speed of said one of the first rotating electric machine and the second rotating electric machine in which the overcurrent abnormality occurs, through the reduction control, by causing the other rotating electric machine in which no overcurrent abnormality occurs to produce regenerative torque while placing the speed change device in the released state or the slipping state, when electric power that can be received by the power storage device is equal to or larger than a predetermined value; and
the electronic control unit is configured to reduce the rotational speed of said one of the first rotating electric machine and the second rotating electric machine in which the overcurrent abnormality occurs, through the reduction control, by changing a speed ratio of the speed change device, when the electric power that can be received by the power storage device is smaller than the predetermined value.

12. The vehicle according to claim 7, wherein:
the electronic control unit is configured to reduce the rotational speed of said one of the first rotating electric machine and the second rotating electric machine in which the overcurrent abnormality occurs, through the reduction control, by causing the other rotating electric machine in which no overcurrent abnormality occurs to produce regenerative torque while placing the speed change device in the released state or the slipping state, when electric power that can be received by the power storage device is equal to or larger than a predetermined value; and the electronic control unit is configured to reduce the rotational speed of said one of the first rotating electric machine and the second rotating electric machine in which the overcurrent abnormality occurs, through the reduction control, by keeping the speed change device in the released state without changing a speed ratio of the speed change device, when the electric power that can be received by the power storage device is smaller than the predetermined value, and the speed ratio of the speed change device cannot be changed.

13. A control method for a vehicle, the vehicle including an AC rotating electric machine coupled to a wheel of the vehicle, an inverter configured to supply phase current to the rotating electric machine, and an electronic control unit, the control method comprising:

performing, by the electronic control unit, reduction control for reducing a rotational speed of the rotating electric machine, when the phase current exceeds a permissible value to bring about an overcurrent abnormality during rotation of the rotating electric machine; and determining, by the electronic control unit, that a short-circuit fault occurs in the inverter, when the phase current flows in the rotating electric machine even when a command to bring the inverter into a gate turn-off state is generated while the rotational speed of the rotating electric machine is reduced to be lower than a threshold speed through the reduction control.

* * * * *